UNITED STATES PATENT OFFICE.

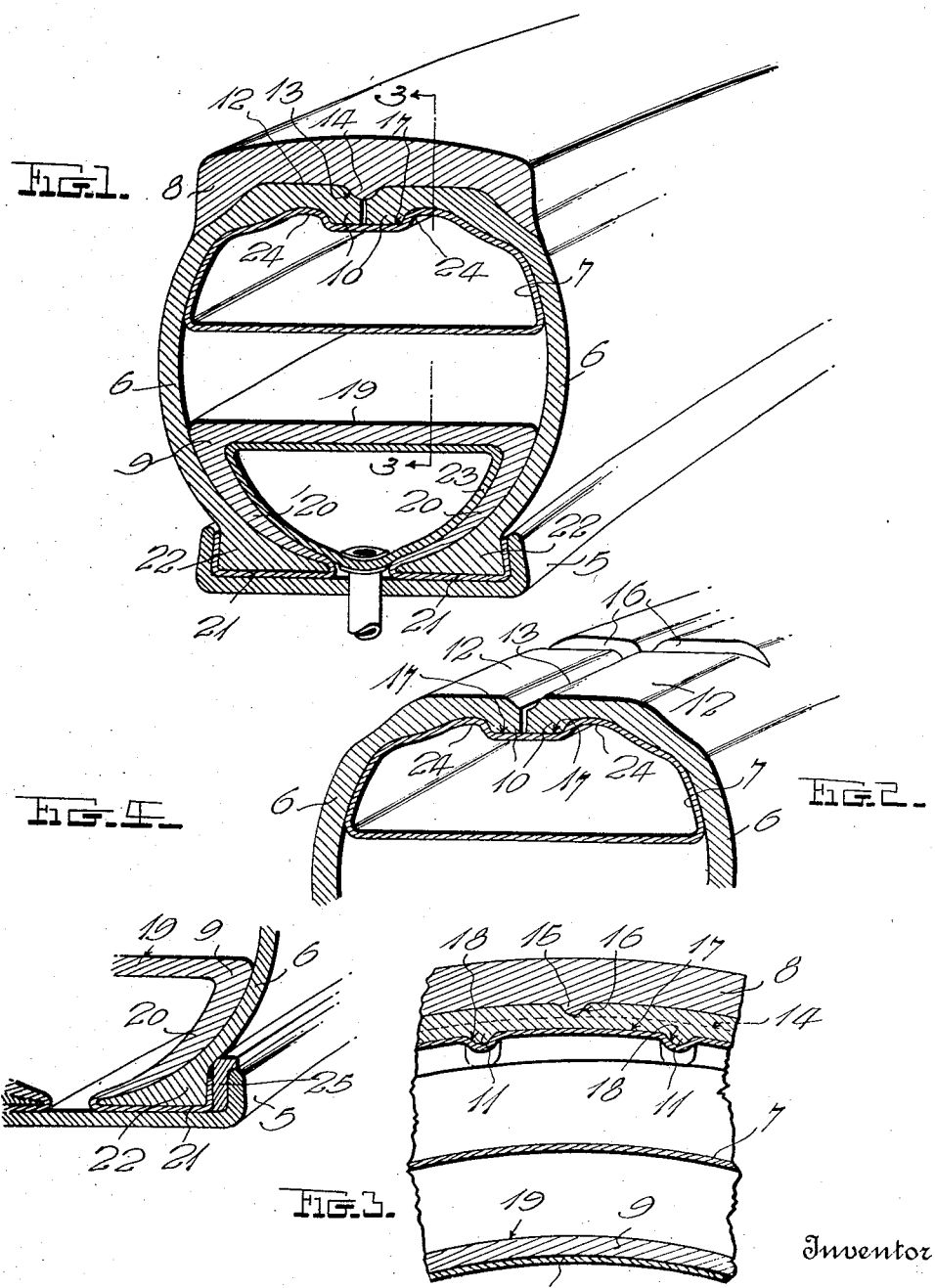

MORGAN A. GREENE, OF RUPERT, IDAHO.

RESILIENT TIRE.

1,354,392.          Specification of Letters Patent.          Patented Sept. 28, 1920.

Application filed July 14, 1919. Serial No. 310,577.

*To all whom it may concern:*

Be it known that I, MORGAN A. GREENE, a citizen of the United States, residing at Rupert, in the county of Minidoka and State of Idaho, have invented certain new and useful Improvements in Resilient Tires; and I do declare the following to be a full, clear, and exact description of the invention, such as will enable others skilled in the art to which it appertains to make and use the same.

This invention relates to resilient tires, and more specifically to an improved tire construction in which the resilient effect is obtained from a ring of solid and relatively stiff material, in contradistinction to the tires which are known as "pneumatic", and in which the tread portion exerts a tensile stress on the rim-engaging portion, in contradistinction to the action of "cushion" tires.

One object of this invention is to generally improve upon devices of this character by providing a structure which is strong, durable, highly resilient, and which can be manufactured at a comparatively low cost.

Other objects and advantages may become apparent to persons who read the following details of description in connection with the accompanying drawing in which:

Figure 1 is a cross sectional perspective view of a tire formed in accordance with the present invention and fitted on a radially flanged wheel-rim.

Fig. 2 is a fragmental detail view illustrating the formation and mutual relation of the tread portions of the two primarily separate sections of the tire-casing.

Fig. 3 is a fragmental detail view in vertical section, the section being taken substantially along the line 3—3 of Fig. 1.

Fig. 4 is a fragmental detail view illustrating the application of a tire stretching member or flanged ring between a bead of the casing and a flange of the rim.

Referring to these drawings in detail, in which similar characters correspond with similar parts throughout the several views, and in which the rim 5 may be of any appropriate construction, being preferably collapsible,—the invention comprises two primarily separate casing sections 6, an annular filler member 7, a tread band 8 and an elastic annular member 9 constituting an inner filler and a pair of tire-bead clamps, each of the members 6 to 9 inclusive being of novel and improved construction.

Each of the tire casing sections 6 is formed with an annulus 10 which has a smaller internal diameter than the adjoining inner surface of this section, and each annulus 10 is provided with a plurality of inwardly projecting ribs or ridges 11. Moreover, the tread portions 12 of the casing sections are depressed at their inner edges, so that when these edges are brought together, as illustrated in Figs. 1 and 2, an annular channel 13 is formed between the tread portions 12. The tread band 8 is provided with an annular ridge or rib 14 which fits in the channel 13, and moreover, the tread band 8 is provided with inwardly projecting ridges 15 which extend laterally of the tread band and are fitted in corresponding grooves 16 which are formed in the tread portions 12 and extend laterally thereof.

A relatively rigid, but somewhat yieldable and springy filler member 7 is formed with an annular groove or channel 17 into which each annulus 10 extends, and a plurality of lateral grooves 18 are formed in and extend across the side walls of the annular groove 17. These lateral grooves receive the ribs or ridges 11 of the tire casing sections, as clearly illustrated in Fig. 3.

The annular member 9 constitutes an inner filler and a pair of tire-bead clamps, as clearly illustrated in Fig. 1, the peripheral element 19 of this member having laterally curved spring elements 20 extending inwardly from its edges and seated against the inner surface of the casing. Each element 20 has a springy flange 21 extending laterally and radially outward from its inner edge, and the elements 20 and 21 embrace and grip the beads 22 of the casing, thereby holding the inner portions of the tire in proper relation to one another and to the rim, while imparting to the lateral sides of the casing the desired curvature. The spring action of the elements 20 is ordinarily sufficient to hold the beads 22 adjacent to the flanges of the rim 5, but where the tire is subjected to exceedingly heavy loads, an inflatable rubber tube 23 may be disposed within the annular cavity of this member 9. When this tube 23 is inflated, the elasticity of the air therein supplements the elasticity of the elements 20. However, other filling means may be employed for supplementing the elasticity of the elements 20.

Although any appropriate material may be employed in constructing the members 6 to 9 inclusive, the member 7 is here illustrated as being of tubular form, and when thus constructed, metal may constitute the material thereof, and the annulus 9 may be formed of springy metal. However, the invention is not limited to any specific material or a hollow filler 7.

The casing sections 6 are preferably formed of combined rubber and fabric, so that they are sufficiently elastic and flexible to permit the annulus 10 of each section to be stretched over the ridges 24 which constitute side walls of the annular groove 17, and after passing over these ridges, the annulus 10 of each section contracts by its inherent elasticity so as to hug or grip the bottom of the groove 17. This frictional contact of the annuli 10 and groove 17 tends to prevent creeping of the tire sections with relation to the filler 7, and the engagement of the ridges 11 with the lateral grooves 18 supplements this frictional engagement so as to effectually prevent such creeping of parts with relation to one another. Similarly, the engagement of the ridges 15 and grooves 16 supplement the frictional engagement of the tread band with the tread portions 12, while the engagement of the peripheral ridge 14 with the annular channel 13 tends to prevent lateral movement of the tread band relative to the casing sections. However, except in cases of emergency, it is contemplated to employ cement for securing the tread band in place, or the same may be vulcanized on the casing sections.

For the purpose of increasing the tension of the curved sides of the casing sections, when necessary or desirable, a tensioning ring 25 may be fitted between each flange of the rim 5 and the adjacent radial extension of the element 21, and either one or two of such rings 25 may be employed.

Although I have described this embodiment of my invention specifically, it is not intended to limit the invention to these exact details of construction and arrangements, but changes may be made within the scope of the inventive ideas as implied and claimed.

What I claim as my invention is—

1. In a tire, a casing comprising two primarily separate annular sections each formed with a rim-engaging portion and a tread portion, each tread portion having an annulus extending radially inward therefrom, an annular filler member having an annular groove in which the annulus of each of said sections is seated, and a tread band secured on said tread portions and bridging the joint between them.

2. In a tire, a casing comprising two primarily separate annular sections each formed with a rim-engaging portion and a tread portion, each tread portion having an annulus extending radially inward therefrom, each annulus having inwardly projecting laterally extending ridges, a filler member formed with an annular groove and with laterally extending grooves, the annulus of each of said sections being fitted in the annular groove of said filler member while said ridges are seated in said lateral grooves, and a tread band co-acting with said filler member to prevent displacement of said sections relative to one another.

3. In a tire, a casing comprising two primarily separate annular sections each formed with a rim-engaging portion and a tread portion, each tread portion having an annulus extending radially inward therefrom, an annular filler member having an annular groove in which the annulus of each of said sections is seated, and a tread band secured on said tread portions and briding the joint between them said tread band being formed with inwardly projecting laterally extending ridges, said tread portions being formed with laterally extending grooves in which the ridges of said tread band are seated.

4. In a tire, a casing comprising two primarily separate annular sections each formed with a rim-engaging portion and a tread portion, each tread portion having an annulus extending radially inward therefrom, an annular filler member having an annular groove in which the annulus of each of said sections is seated, and a tread band secured on said tread portions and bridging the joint between them, said tread band being formed with inwardly projecting laterally extending ridges, said tread portions being formed with laterally extending grooves in which the ridges of said tread band are seated, said tread portions being formed to provide an annular channel where they adjoin one another said tread band being formed with an annular ridge which is seated in said channel.

In testimony whereof I have hereunto set my hand.

MORGAN A. GREENE.